(12) United States Patent
Kisaka

(10) Patent No.: US 7,538,964 B2
(45) Date of Patent: May 26, 2009

(54) MAGNETIC DISK DRIVE

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/811,032

(22) Filed: Jun. 7, 2007

(65) Prior Publication Data

US 2008/0055766 A1 Mar. 6, 2008

(30) Foreign Application Priority Data

Jun. 9, 2006 (JP) ............................. 2006-161582

(51) Int. Cl.
G11B 21/02 (2006.01)
(52) U.S. Cl. ...................................... 360/75
(58) Field of Classification Search ........................ None
See application file for complete search history.

(56) References Cited

U.S. PATENT DOCUMENTS

| 5,325,247 | A | * | 6/1994 | Ehrlich et al. ............. 360/78.09 |
| 6,153,997 | A | * | 11/2000 | Kobayashi et al. ........... 318/560 |
| 6,704,160 | B2 | | 3/2004 | Takakura |
| 7,046,478 | B2 | * | 5/2006 | Zhang et al. ............. 360/77.08 |
| 7,315,430 | B2 | * | 1/2008 | Kisaka ..................... 360/77.04 |
| 2003/0161065 | A1 | | 8/2003 | Yatsu |

FOREIGN PATENT DOCUMENTS

| JP | 08-126370 | 5/1996 |
| JP | 2001-209402 | 8/2001 |
| JP | 2001-296906 | 10/2001 |
| JP | 2001-325005 | 11/2001 |

* cited by examiner

*Primary Examiner*—K. Wong
(74) *Attorney, Agent, or Firm*—Townsend and Townsend and Crew LLP; Patrick Duncan

(57) ABSTRACT

Embodiments in accordance with the present invention provide a magnetic disk drive capable of alleviating an adverse effect of vibrations inherent to a housing on positioning control, reducing the adverse effect over other frequency range, and stabilizing the positioning control. In a magnetic disk drive according to embodiments of the present invention, a position control circuit that controls the position of a magnetic head produces a signal, based on which the position of the magnetic head is controlled, according to positional information read by the magnetic head. The signal is transmitted via a multi-rate filter circuit that decreases a sensitivity function relevant to a predetermined object frequency by a first predetermined gain, and suppresses an increase in the sensitivity function relevant to frequencies lower than the object frequency to a second predetermined gain.

3 Claims, 4 Drawing Sheets

TO HOST

US 7,538,964 B2

MAGNETIC DISK DRIVE

CROSS-REFERENCE TO RELATED APPLICATION

The instant nonprovisional patent application claims priority to Japanese Patent Application No. 2006-161582 filed Jun. 9, 2006 and incorporated by reference in its entirety herein for all purposes.

BACKGROUND OF THE INVENTION

Magnetic disk drives including a hard disk drive, have data recorded in circumferential or spiral loci (tracks) formed on a disk such as a magnetic recording medium. For writing or reading of the data, control (positioning control) is extended to move a magnetic head to any of the tracks.

In conventional positioning control, a signal is processed via a filter that degrades sensitivity at a frequency corresponding to the frequency of vibrations inherent to a housing. However, this causes sensitivity functions relevant to other frequencies to rise, or, anyhow, adversely affect the sensitivity functions relevant to the other frequencies. Moreover, since the transfer function of a control circuit assumes a real number value at a Nyquist frequency, a phase is always 0° or 180°. As a frequency gets closer to the Nyquist frequency, it is hard to improve the sensitivity function by advancing the phase.

U.S. Patent Publication No. 2003/161065 ("Patent Document 1") or the like, has disclosed a technology for expanding a controllable frequency range by adopting a multi-rate estimator for a feedback control system.

BRIEF SUMMARY OF THE INVENTION

Embodiments in accordance with the present invention provide a magnetic disk drive capable of alleviating an adverse effect of vibrations inherent to a housing on positioning control, reducing the adverse effect over other frequency range, and stabilizing the positioning control. In a magnetic disk drive according to an embodiment of the present invention, a position control circuit that controls the position of a magnetic head produces a signal, based on which the position of the magnetic head is controlled, according to positional information read by the magnetic head. The signal is transmitted via a multi-rate filter circuit that decreases a sensitivity function relevant to a predetermined object frequency by a first predetermined gain, and suppresses an increase in the sensitivity function relevant to frequencies lower than the object frequency to a second predetermined gain.

DETAILED DESCRIPTION OF THE INVENTION

Embodiments in accordance with the present invention relate to a magnetic disk drive such as a hard disk drive.

An object of embodiments in accordance with the present invention is to provide a magnetic disk drive capable of stabilizing positioning control by alleviating an adverse effect of vibrations inherent to a housing on positioning control and minimizing the adverse effect over other frequencies.

Embodiments of the present invention address problems underlying the related art by providing a magnetic disk drive comprising: a magnetic disk medium in which data and positional information are recorded along a predetermined locus; a magnetic head that moves relatively to the magnetic disk medium so as to write or read the data and read the positional information at every predetermined timing; and a position control circuit that detects the position of the magnetic head on the predetermined locus according to the positional information read by the magnetic head, and controls the position of the magnetic head so that the magnetic head will be positioned on a locus in or from which data is written or read. The position control circuit produces a signal, based on which the position of the magnetic head is controlled, according to the positional information read by the magnetic head. The position control circuits transmits the signal via a multi-rate filter circuit that decreases a sensitivity function relevant to a predetermined object frequency by a first predetermined gain, suppresses an increase in the sensitivity function, which relates to frequencies lower than the object frequency, to a second predetermined gain.

Figure 1:
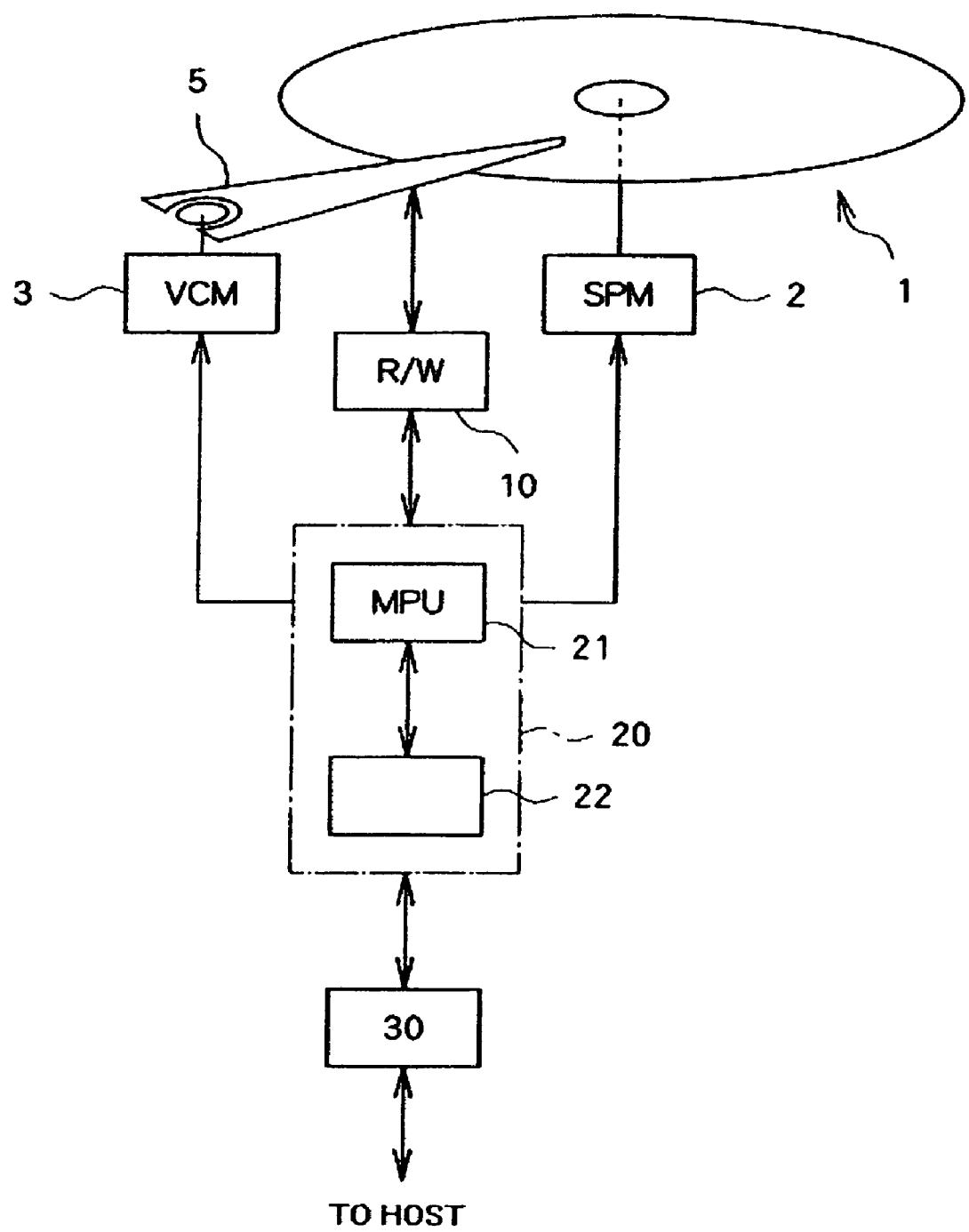
FIG. 1 is a block diagram showing an example of the configuration of a magnetic disk drive in accordance with an embodiment of the present invention.

An embodiment of the present invention will be described with respect to drawings. A magnetic disk drive in accordance with the embodiment of the present invention is, for example, a hard disk drive like the one shown in FIG. 1, and includes, as shown in FIG. 1, a magnetic disk medium 1, a spindle motor (SPM) 2, a voice coil motor (VCM) 3, a magnetic head assembly 5, a read/write (R/W) channel circuit 10, a hard disk controller (HDC) 20, and a host controller 30. The hard disk controller 20 includes a microprocessor (MPU) 21 and a memory unit 22.

The magnetic disk medium 1 is driven to rotate by the SPM 2. Multiple concentric tracks whose centers coincide with a center of rotation are formed on the magnetic disk medium 1. In the present embodiment, user data is recorded in a locus defined by each of the concentric tracks. Moreover, servo sectors to be used to detect the position of the magnetic head located at the distal end of the magnetic head assembly are defined in each of the tracks.

Based on information on a servo sector read by the magnetic head, the position of the magnetic head on the magnetic disk medium 1 is detected at intervals of a sampling cycle Ts determined with the number of rotations of the SPM 2 and the number of sectors per track. The VCM 3 is controlled with a VCM drive signal sent from the HDC 20, and drives the magnetic head assembly 5 so that the magnetic head assembly 5 will be rotated with a pivot P as an axis.

The magnetic head assembly 5 includes a carriage, a suspension attached to the distal end of the carriage, and the magnetic head borne by the suspension. A signal read from the magnetic disk medium 1 by the magnetic head is amplified by an amplifier, and transmitted to the R/W channel circuit 10. Moreover, the magnetic head records information in the magnetic disk medium 1 on the basis of a signal received from the R/W channel circuit 10 via the amplifier.

The magnetic head assembly 5 is driven to rotate with the pivot P as the axis of rotation by means of the VCM 3. Consequently, the magnetic head located at the distal end of the magnetic head assembly 5 moves relatively to the magnetic disk medium 1 so as to write or read data.

The R/W channel circuit 10 demodulates a signal read by the magnetic head, and transmits data, which is obtained by demodulating the signal, to the HDC 20. Moreover, the RJW channel circuit 10 modulates data which is received from the HDC 20 and is to be recorded, and transmits the data to the magnetic head assembly 5.

The MPU 21 included in the HDC 20 operates according to a program stored in the memory unit 22. Herein, the MPU 21 controls the VCM 3 so as to control positioning of the magnetic head. The MPU 21 transmits a VCM control signal, based on which the magnetic head is moved, to the position of a track from or in which data is read or recorded. Moreover, the MPU 21 transmits the VCM control signal so that the magnetic head will lock on to the track from or in which data is read or recorded. The positioning control action of the MPU 21 will be described later.

Moreover, the MPU 21 included in the HDC 20 transmits data, which is received from the R/W channel circuit 10, to the host controller 30. Furthermore, the MPU 21 transmits data, which is received from the host controller 30, to the R/W channel circuit 10.

The memory unit 22 includes a memory element such as a random access memory (RAM) or a read-only memory (ROM). In the memory unit 22, programs to be run by the MPU 21 are stored. Moreover, the memory unit 22 serves as a work memory for the MPU 21.

The host controller 30 is connected to a host system such as a personal computer. The host controller 30 transmits data received from the HDC 20 to the host system. Moreover, the host controller 30 transmits data or instructions received from the host system to the HDC 20.

Next, processing of positioning control to be performed by the MPU 21 included in the HDC 20 will be described below. The MPU 21 that performs the processing functionally forms a circuit shown in FIG. 2.

Figure 2:
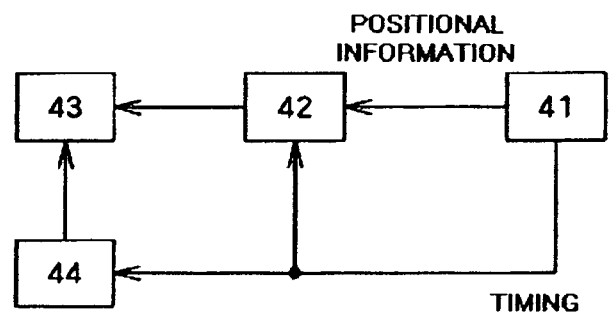
FIG. 2 is a functional block diagram showing an example of a positioning mechanism included in the magnetic disk drive in accordance with an embodiment of the present invention.

A positioning mechanism included in the magnetic disk drive in accordance with the present embodiment functionally includes, as shown in FIG. 2, a positional information decoder 41, a controller 42, a multi-rate controller 43, and an M-times sample generator 44.

The positional information decoder 41 decodes positional information from a servo signal read by the magnetic head, and transmits the positional information to the controller 42. The positional information decoder 41 transmits timing information that signifies the timing of the servo signal being read. The timing information is represented by, for example, a pulsating signal that goes high or rises when the servo signal is read, and goes low on the other occasion.

The controller 42 produces a control signal, based on which the VCM 3 is controlled, according to the positional information and timing information sent from the positional information decoder 41. Production of the VCM control signal by the controller 42 is identical to conventional one. The iterative description will be omitted.

The multi-rate controller 43 receives a signal, which signifies sampling timing, from the M-times sample generator 44 that will be described later, and samples a signal produced by the controller 42 according to the sampling timing. The multi-rate controller 43 included in the present embodiment increases a gain over frequencies higher than a Nyquist frequency determined at the timing of servo signal being read. Thus, the phase of an output signal of the controller 42 is advanced. Moreover, the multi-rate controller 43 decreases a sensitivity function relevant to a frequency designated within a frequency domain, which includes frequencies lower than the mechanical resonant frequency of a housing or the like and in which the sensitivity function exceeds 0 dB, by a first predetermined gain X dB. Moreover, the multi-rate controller 43 suppresses an increase in the sensitivity function, which relates to frequencies lower than the designated frequency, to a second predetermined gain Y dB.

Incidentally, the first gain X may be equal to or smaller than 1.6 dB because a decrease of 20% or more is estimated in consideration of a variance. Moreover, the second gain Y may be equal to or smaller than 0.5 dB because a decrease of about 5% is regarded to be encompassed by the variance.

In the present embodiment, consideration is taken into the fact that when a sensitivity level (gain) is reduced over a certain frequency range according to an area formula for a sensitivity function (a formula causing a result of integration, which is performed on a logarithm of a gain that is a sensitivity function over frequencies, to become zero), the gain must be increased over the other frequency range. Consequently, the gain is decreased relative to a frequency (object frequency) of aerial vibrations derived from the rotation of the SPM made to move the magnetic head, and the gain is increased over a frequency range that is unrelated to mechanical resonance and is higher than a Nyquist frequency. The design of the multi-rate controller 43 responsible for this control will be described later.

The M-times sample generator 44 transmits a pulsating signal that rises at intervals of a predetermined cycle which elapses M times more quickly than the cycle of the timing of servo information being read.

For example, assuming that M is set to 2, that is, a double number of samples is acquired, the transfer function of the multi-rate controller 43 will be described below. Herein, z1 shall be a z value in a definitional equation of Z-transform defined for a sample time ts, and z2 shall be the z value in the definitional equation of Z-transform defined for a sample time that elapses M times more quickly (where M equals 2).

[Equation 1]

$$z_1 = e^{j2\pi f t_s}$$

$$z_2 = e^{j2\pi f t_s/2} \tag{1}$$

Assuming that when pieces of positional information Y(z1) are read, the controller 42 provides outputs c0, c1, c2, and so on. An output of the controller 42 to be sampled is updated for each sample time. Consequently, input signals of the multi-rate controller 43 are signals c0, c0, c1, c1, c2, c2, etc.

Assuming that the inputs of the multi-rate controller 43 are denoted by U(z2) and the transfer function of the controller 42 is denoted by C(z1), the equation (2) below is drawn out.

[Equation 2]

$$\begin{aligned} U(z_2) &= c_0 + c_0 z_2^{-1} + c_1 z_2^{-2} + c_1 z_2^{-3} + c_2 z_2^{-4} + c_2 z_2^{-5} + \cdots \\ &= (1 - z_2^{-1})(c_0 + c_1 z_2^{-2} + c_2 z_2^{-4} + \cdots) \\ &= (1 - z_2^{-1}) C(z_1) Y(z_1) \end{aligned} \tag{2}$$

Assuming that s denotes an s value in the definitional equation of Laplace transform and V(s) denotes the transfer function of the VCM 3, the position Y(s) of the magnetic head is expressed by the following equation (3):

[Equation 3]

$$Y(s) = V(s)\frac{1-z_2^{-1}}{s}H(z_2)(1+z_2^{-1})C(z_1)Y(z_1)$$

$$= V(s)\frac{1-z_1^{-1}}{s}H(z_2)C(z_1)Y(z_1) \qquad (3)$$

where $C(z1)$ denotes the transfer function of the controller 42 and $H(z2)$ denotes the transfer function of the multi-rate controller 43.

Herein, since Y(s) is sampled relevant to a sample frequency fs, the above equation can be rewritten using an imaginary unit j as follows:

[Equation 4]

$$Y(z_1) = \frac{1}{t_s}\sum_{n=-\infty}^{\infty} Y(s-j2\pi n f_s) \qquad (4)$$

Moreover, the transfer function of the VCM 3 is typically written as follows:

[Equation 5]

$$V(s) = K\frac{1}{s^2} \qquad (5)$$

where K denotes a constant. As seen from the equation (5), as a frequency gets higher, the value of the transfer function approaches 0. Namely, as long as the frequency ranges from zero to fs/2, $Y(z1)$ is approximated as follows:

[Equation 6]

$$Y(z_1) \approx \frac{1}{t_s}\{Y(s) + Y(s-j2\pi f_s)\} \qquad (6)$$

$$= \frac{1-z_1^{-1}}{t_s}\left\{\frac{1}{s}V(s)H(e^{st_s/2}) + \frac{1}{s-j2\pi f_s}V(s-j2\pi f_s)H(e^{st_s/2-j\pi})\right\}C(z_1)Y(z_1)$$

An open loop function OH is written as follows:

[Equation 7]

$$O_H = \qquad (7)$$

$$\frac{1-z_1^{-1}}{t_s}\left\{\frac{1}{s}V(s)H(e^{st_s/2}) + \frac{1}{s-j2\pi f_s}V(s-j2\pi f_s)H(e^{st_s/2-j\pi})\right\}C(z_1)$$

As seen from the equation (7), according to the present embodiment, V(s)H(z2) is, instead of the value of the transfer function V(s) of the VCM 3, handled as a discrete value relevant to the sample time ts using a zero-hold technique.

When the multi-rate controller 43 is regarded as an M-order finite impulse response (FIR) filter, the frequency characteristic of the open loop function OH is calculated as follows:

[Equation 8]

$$O_H = \frac{1-z_1^{-1}}{t_s}\sum_{i=0}^{M}\left\{\frac{1}{s}V(s)a_i z_2^{-i} + \frac{1}{s-j2\pi f_s}V(s-j2\pi f_s)a_i z_2^{-i}e^{-ji\pi}\right\}C(z_1) \qquad (8)$$

$$= AV_H$$

Herein,

[Equation 9]

$$A = [a_0, a_1, \ldots, a_M] \qquad (9)$$

$$V_H =$$

$$\frac{1-\cos\omega t_s + j\sin\omega t_s}{t_s}C(e^{j\omega t_s})\left\{\frac{1}{s}V(s)\begin{bmatrix}1\\\cos\frac{\omega t_s}{2} - j\sin\frac{\omega t_s}{2}\\\vdots\\\cos\frac{M\omega t_s}{2} - j\sin\frac{M\omega t_s}{2}\end{bmatrix} + \frac{1}{s-j2\pi f_s}V(s-j2\pi f_s)\begin{bmatrix}1\\e^{-j\pi}\left(\cos\frac{\omega t_s}{2} - j\sin\frac{\omega t_s}{2}\right)\\\vdots\\e^{-jM\pi}\left(\cos\frac{M\omega t_s}{2} - j\sin\frac{M\omega t_s}{2}\right)\end{bmatrix}\right\}$$

Namely, the frequency characteristic of the open loop function OH is provided as a linear function of a coefficient vector A.

On the other hand, when the multi-rate controller 43 is unused, the open loop function O is expressed as follows:

[Equation 10]

$$O = V(z_1)C(z_1) \qquad (10)$$

where $V(z1)$ denotes a discrete value of the transfer function V(s) relevant to the sample frequency fs.

Figure 3:
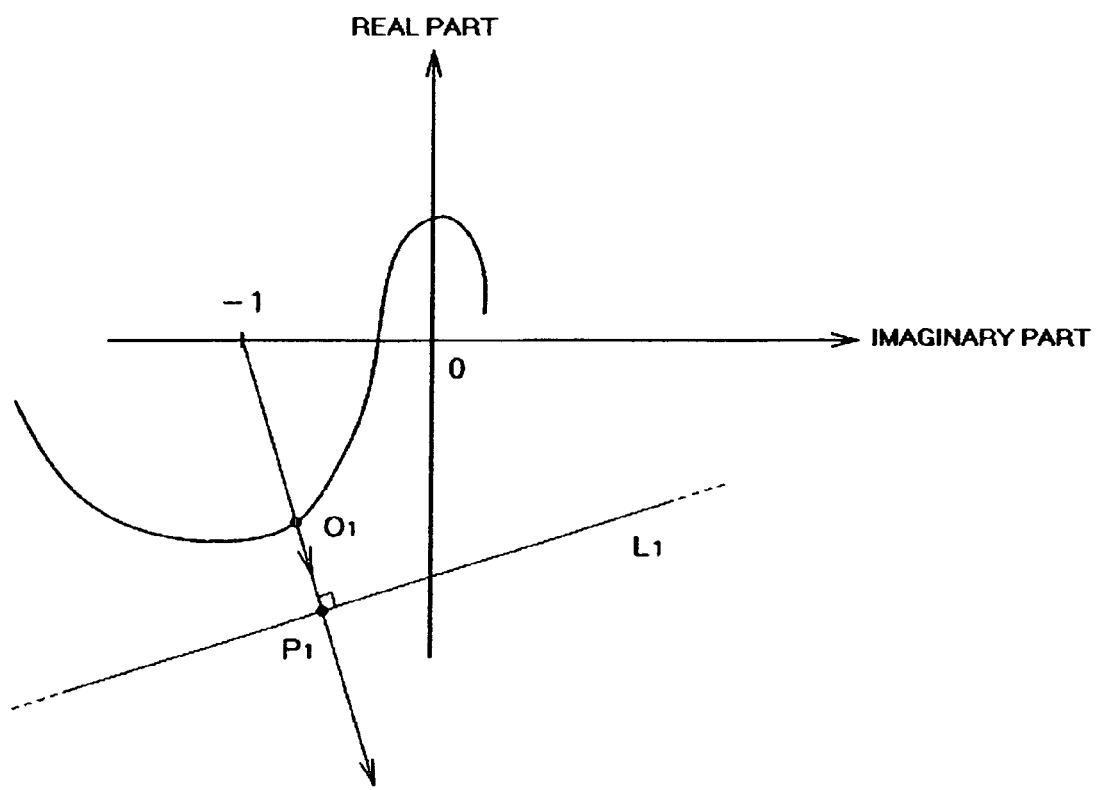
FIG. 3 is an explanatory diagram showing an example of a Nyquist diagram expressing an open loop function obtained when a multi-rate controller is not employed.

Assuming that the multi-rate controller 43 is used to improve the frequency characteristic in a specific frequency domain, a Nyquist diagram expressing the open loop function O obtained when the multi-rate controller 43 is unused is plotted as shown in FIG. 3. In FIG. 3, point O1 indicates the value of the open loop function O relevant to a frequency f1.

An adverse effect of disturbance F in the system is expressed as follows:

[Equation 11]

$$\frac{F}{1+O} \qquad (11)$$

Herein,

[Equation 12]

$$\frac{1}{1+O} \qquad (12)$$

The above equation gives a sensitivity function. The sensitivity function is provided as an inverse number of the distance between a point (−1,0) and the point O1 in FIG. 3. Assuming that the value of a transfer function is P1, as the distance between a point P1 and the point (−1,0) gets larger than the distance between the point O1 and point (−1,0), a disturbance suppression ability relevant to the frequency f1 can be said to have improved. In the present embodiment, the transfer function OH should be determined so that the point P1 will exist to recede from the point (−1,0) on the extension of the straight line linking the point O1 and point (−1,0). In other words, the transfer function OH should be determined to fall within a domain, to which the point (−1,0) does not belong, out of domains partitioned by a straight line L1 orthogonal to a straight line extending from the straight line directed from the point (−1,0) to the point O1.

The point P1 is expressed using a variable 1 as follows:

[Equation 13]

$$P_1 = (1-l)O_1 - l \quad (13)$$

Herein, when the variable 1 is a negative value, the point P1 is plotted as shown in FIG. 3. In order to improve the original transfer function so that the value of the transfer function will become X times larger, the variable 1 is calculated by solving the following expression:

[Equation 14]

$$\frac{1}{|1+O_1|}X = \frac{1}{|1+P_1|} = \frac{1}{|1-l||1+O_1|} \quad (14)$$

Consequently,

[Equation 15]

$$l = 1 - \frac{1}{X} \quad (15)$$

Incidentally, as seen from the Nyquist diagram shown in FIG. 3, when the point O1 is turned in a direction in which a phase advances (counterclockwise), a sensitivity function improves (that is, recedes from the point (−1,0)).

As mentioned above, the variable 1 relevant to a designated frequency is calculated, and P1 is determined. Now, vectors defined below are taken into consideration.

[Equation 16]

$$[Re(O_H - P_1), Im(O_H - P_1)] \quad (16)$$

[Equation 17]

$$[Re(O_1) + 1, Im(O_1)] \quad (17)$$

If an angle at which the vectors meet is equal to or smaller than 90°, the transfer function OH exists in a domain, to which the point (−1,0) does not belong, out of domains partitioned by the line L1. Herein, Re(α) denotes a real part of α, and Im(α) denotes an imaginary part of α. The foregoing condition is expressed as follows:

[Equation 18]

$$(Re(O_1)+1)\{Re(O_H) - Re(O_1) - lRe(-1-O_1)\} + \quad (18)$$
$$Im(O_1)\{Im(O_H) - Im(O_1) - lIm(-O_1)\} > 0$$

where OH denotes a linear function of the coefficient vector A, and O1 can be calculated by designating a frequency.

Namely, since the solution of the conditional expression is linear to A, the solution relevant to A can be obtained according to any of the ordinary methods adaptable to linear matrix inequalities (LMI).

Based on the coefficient vector A deduced as mentioned above, a coefficient for the transfer function of a filter that is the multi-rate controller 43 can be worked out. The multi-rate controller 43 should be designed as a filter realizing the transfer function. When the multi-rate controller is not employed, the value of the transfer function relevant to a Nyquist frequency is provided as a real number. This signifies that a phase cannot be advanced. Namely, when a frequency domain over which a sensitivity function should be improved is close to the Nyquist frequency, it is hard to improve the sensitivity function. The present embodiment is adaptable even when the frequency domain is close to the Nyquist frequency.

An example will be described below. The resonant frequency of a housing of a magnetic disk concerned shall be equal to or lower than 5 kHz. The resonant frequency shall be, for example, close to 2.2 kHz. When the resonant frequency is lower than 2.2 kHz, or especially, equal to or lower than a zero-crossing frequency for an open loop function, the open loop function is equal to or larger than 0 dB. Therefore, an increase in a sensitivity function should preferably be suppressed for fear the characteristic of seek or tracking may be affected.

Consequently, 1 is set to −0.3 over frequencies close to 2.2 kHz, and set to 0.05 over lower frequencies. In a concrete example, the number of rotations of the magnetic disk medium 1 shall be 5400 rpm (5400 rotations per min), and the number of sectors per track shall be 144. Namely, a sample frequency shall be 12960 Hz. In this case, the transfer function of the VCM 3 is expressed as follows:

[Equation 19]

$$V = \frac{1}{s^2} \frac{1}{t_s^2} \quad (19)$$

A calculation time delay shall be 40% of a sample time. The transfer function of the controller 42 is expressed as follows:

[Equation 20]

$$C = \frac{0.7926375 - 1.8051107 z_1 + 1.0264924 z_1^2}{0.1570326 + 0.7220373 z_1 + z_1^2} \cdot \frac{z_1}{z_1 - 1} \quad (20)$$

The M-times sample generator 44 shall generate a signal indicating a sampling timing that comes twice more quickly.

In this example, a result of calculation of A according to the aforesaid method (a finite impulse response (FIR) characteristic is obtained and approximated to the characteristic of an infinite impulse response (IIR) filter) is expressed as follows:

[Equation 21]

$$H = \frac{0.5394027 - 1.3763568 z_2 + 2.3947419 z_2^2 - 2.4541875 z_2^3 + 1.2773306 z_2^4}{0.3443951 - 0.6785587 z_2 + 1.2957661 z_2^2 - 1.5806252 z_2^3 + z_2^4} \quad (21)$$

Figure 4:
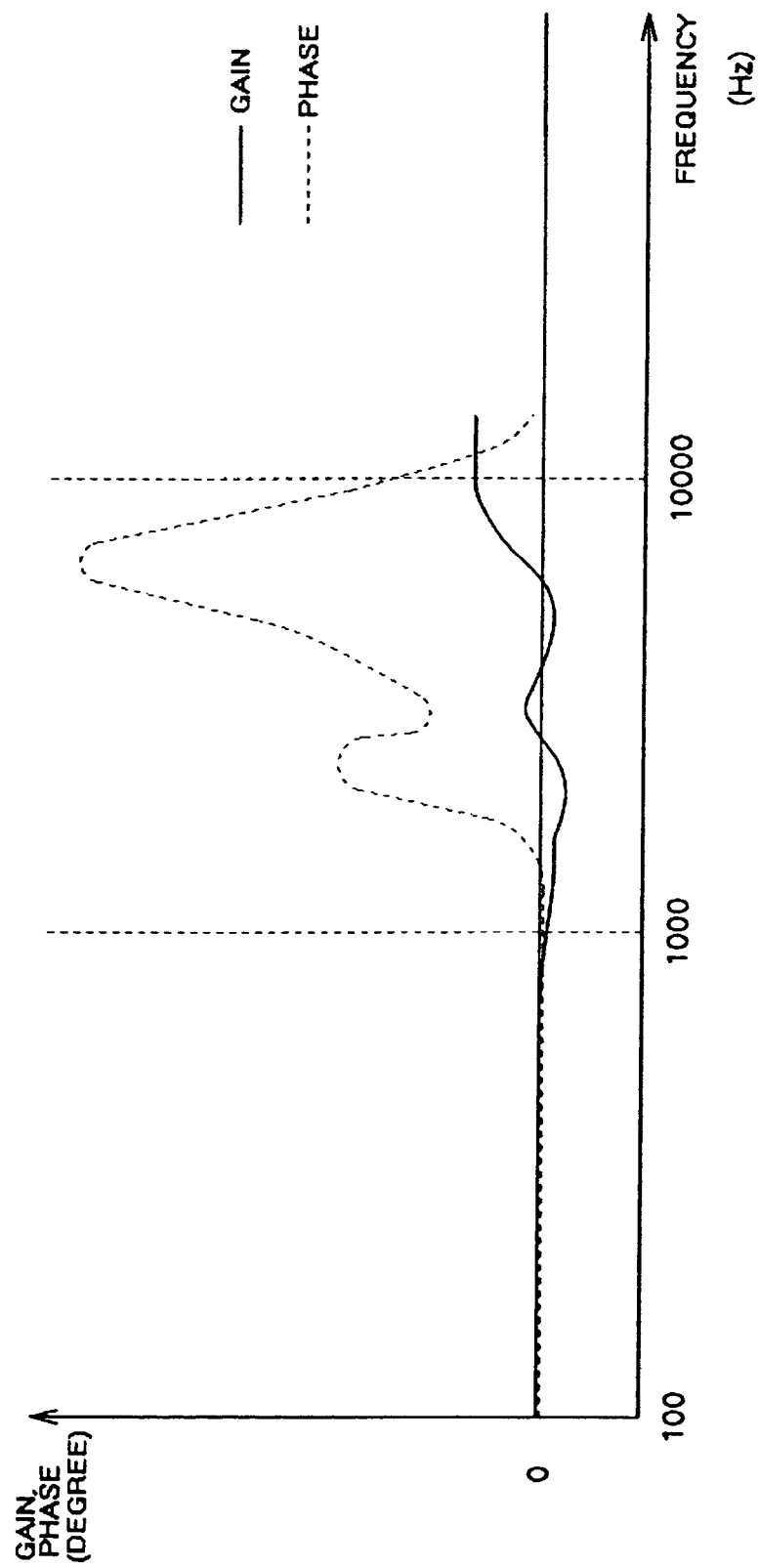
FIG. 4 is an explanatory diagram showing the frequency characteristics of the positioning mechanism included in the magnetic disk drive in accordance with an embodiment of the present invention.
Figure 5:
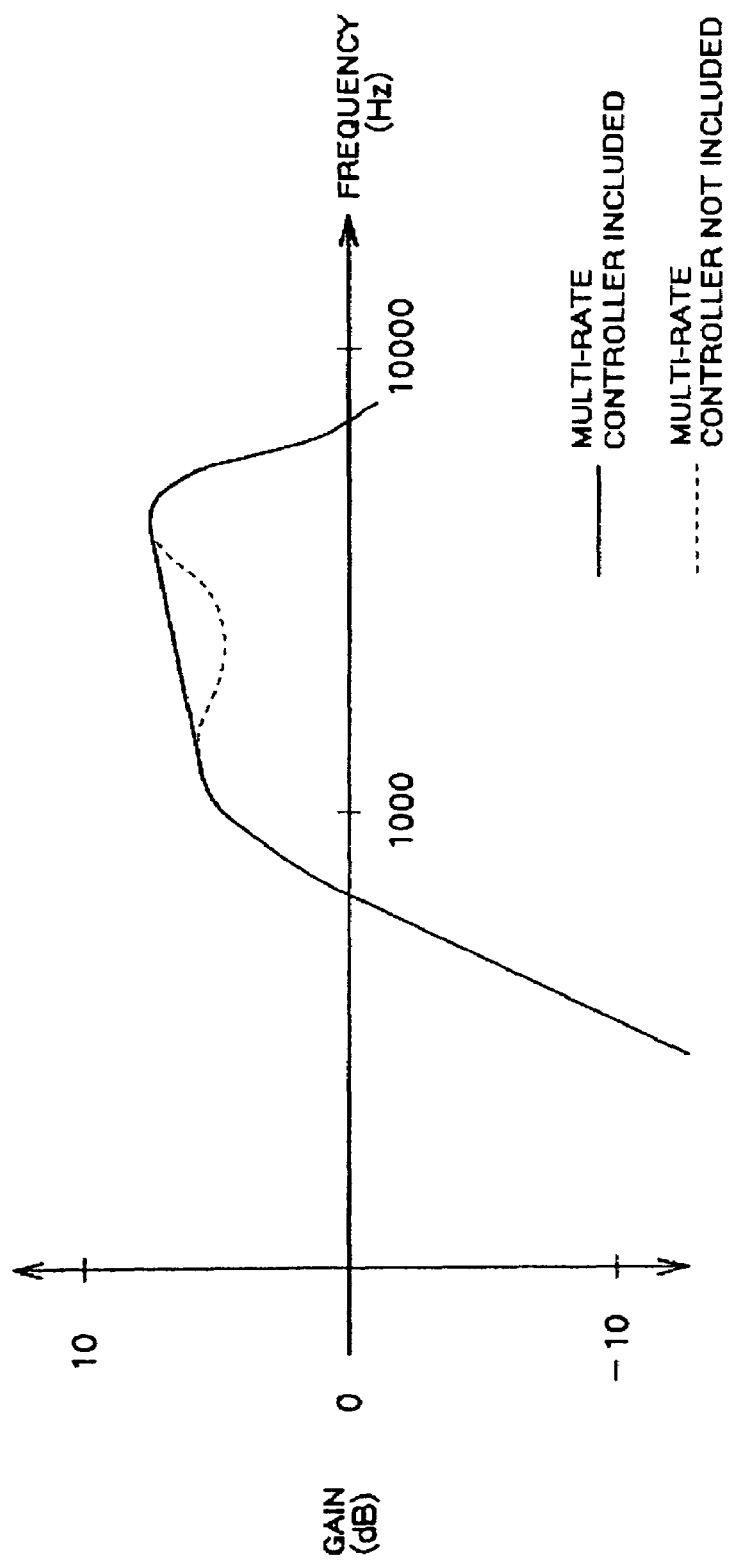
FIG. 5 is another explanatory diagram showing the frequency characteristic of the positioning mechanism included in the magnetic disk drive in accordance with an embodiment of the present invention.

The frequency characteristics (gain and phase) of a transfer function are plotted as shown in FIG. 4. When random noise having the same frequency as the sample frequency fs is applied and Fourier transform is performed, a calculated sensitivity function is plotted as shown in FIG. 5. For comparison, a dashed line indicates an output provided when the multi-rate controller 43 is included. As apparent from FIG. 5, over a frequency band lower than 2.2 kHz, the sensitivity function exhibits nearly the same change irrespective of whether the multi-rate controller 43 is included. The sensitivity (gain) starts decreasing at a frequency close to 2.2 kHz.

As described so far, according to the present embodiment, an adverse effect of vibrations inherent to a housing on positioning control is alleviated, the adverse effect is reduced over other frequency range, and positioning control is stabilized.

What is claimed is:

1. A magnetic disk drive comprising:
   a magnetic disk medium in which data and positional information are recorded along a predetermined locus;
   a magnetic head that moves relatively to the magnetic disk medium so as to write or read the data and read the positional information at every first predetermined timing; and
   a position control circuit that detects the position of the magnetic head on the predetermined locus according to the positional information read by the magnetic head, and transmits a signal, based on which the position of the magnetic head is controlled, so that the magnetic head will be positioned on a locus in or from which data is written or read, wherein:
   the position control circuit produces a signal, based on which the position of the magnetic head is controlled, according to the positional information read by the magnetic head, and transmits the signal via a multi-rate filter circuit that operates at the second predetermined timing that comes more quickly than the first timing, decreases a sensitivity function relevant to a predetermined object frequency by a first predetermined gain by advancing a phase relevant to a Nyquist frequency determined at the first timing, and suppresses an increase in the sensitivity function, which relates to frequencies lower than the object frequency, to a second predetermined gain.

2. The magnetic disk drive according to claim 1, wherein over frequencies equal to or lower than a zero-crossing frequency for an open loop function realized by the multi-rate filter circuit included in the position control circuit, the increase in the sensitivity function is suppressed to the second predetermined gain.

3. A magnetic disk drive comprising:
   a magnetic disk medium in which data and positional information are recorded along a predetermined locus;
   a magnetic head that moves relatively to the magnetic disk medium so as to write or read the data and read the positional information;
   a position control circuit that detects the position of the magnetic head on the predetermined locus according to the positional information read by the magnetic head, and transmits a signal, based on which the position of the magnetic head is controlled, so that the magnetic head will be positioned on a locus in or from which data is written or read, wherein:
   the position control circuit includes:
   a positional information decoder that decodes and transmits the positional information read by the magnetic head, and transmits timing information representing the timing of the positional information being read;
   a controller that transmits a control signal on the basis of the positional information and timing information sent from the positional information decoder;
   an M-times sample generator that transmits sampling timing information that represents the sampling timing which comes M times more quickly than the timing of the positional information being read; and
   a multi-rate controller that samples the control signal, which is sent from the controller, on the basis of the sampling timing information sent from the M-times sample generator, that increases the gain of a filter, which operates within the M-times sample generator, over frequencies near or higher than a Nyquist frequency determined at the timing of the positional information being read, and that suppresses the gain, that is, a sensitivity function over frequencies which are lower than the mechanical resonant frequency of the disk drive and at which the gain or the sensitivity function is larger than 0 dB.

* * * * *